United States Patent
Nakamura et al.

(10) Patent No.: US 7,141,900 B2
(45) Date of Patent: Nov. 28, 2006

(54) CONNECTOR CASE FOR VEHICLE AC GENERATOR

(75) Inventors: Shigenobu Nakamura, Anjo (JP); Kouichi Ihata, Okazaki (JP)

(73) Assignee: Denso Corporation, Kariya (JP)

( * ) Notice: Subject to any disclaimer, the term of this patent is extended or adjusted under 35 U.S.C. 154(b) by 257 days.

(21) Appl. No.: 10/772,388

(22) Filed: Feb. 6, 2004

(65) Prior Publication Data

US 2004/0155540 A1  Aug. 12, 2004

(30) Foreign Application Priority Data

Feb. 12, 2003  (JP) .............................. 2003-033052

(51) Int. Cl.
  *H02K 19/36* (2006.01)
  *H02K 11/00* (2006.01)
  *H02K 11/04* (2006.01)

(52) U.S. Cl. ............... 310/68 D; 310/68 R; 310/71

(58) Field of Classification Search ........... 310/68 D, 310/68 R, 71
  See application file for complete search history.

(56) References Cited

U.S. PATENT DOCUMENTS

| | | | | |
|---|---|---|---|---|
| 2,507,242 A | * | 5/1950 | Bost .................. | 439/49 |
| 3,210,578 A | * | 10/1965 | Sherer .................. | 310/71 |
| 4,100,440 A | * | 7/1978 | Binder et al. ................. | 310/89 |
| 4,232,238 A | * | 11/1980 | Saito et al. ............... | 310/68 D |
| 5,821,674 A | * | 10/1998 | Weiner .................. | 310/68 D |
| 6,818,825 B1 | * | 11/2004 | Tharman ................ | 174/50.52 |
| 2001/0030472 A1 | | 10/2001 | Ihata | |
| 2001/0033116 A1 | * | 10/2001 | Rose .................. | 310/180 |

FOREIGN PATENT DOCUMENTS

| JP | 08085402 A | * | 4/1996 |
|---|---|---|---|
| JP | A 2001-28857 | | 1/2001 |

* cited by examiner

*Primary Examiner*—Darren Schuberg
*Assistant Examiner*—Erik Preston
(74) *Attorney, Agent, or Firm*—Oliff & Berridge, PLC

(57) ABSTRACT

In a vehicle ac generator, a regulator that controls output voltage is mounted to a connector case. The connector case is constructed of a common connector and an individual connector. The common connector includes internal terminals that connect the regulator with internal circuits of such as a rectifying device and a rotor. The individual connector includes external terminals that receive and transmit electric information from and to external circuits. The common connector and the individual connector have intermediate terminals that contact with each other. Further, the common connector and the individual connector have engaging portion to engage with each other. The common connector can be shared with individual connectors having different shapes.

12 Claims, 5 Drawing Sheets

CONNECTOR CASE FOR VEHICLE AC GENERATOR

CROSS REFERENCE TO RELATED APPLICATION

This application is based on Japanese Patent Application No. 2003-33052 filed on Feb. 12, 2003, the disclosures of which are incorporated herein by reference.

FIELD OF THE INVENTION

The present invention relates to an ac generator for a vehicle.

BACKGROUND OF THE INVENTION

An IC generator, which is configured into a form of integrated circuit, is generally used as a regulator for controlling power output of a vehicle ac generator. Originally, the IC regulator mainly controls an electric current supply to a field coil of a rotor for regulating magnetomotive force of field poles so that an output voltage of the vehicle ac generator is on a predetermined level. Recently, in order to improve fuel efficiency and drivability of vehicles, the IC regulator is required to have various functions of controlling power generations by receiving vehicle information such as from a vehicle-mounted computer.

For example, the function is a gradual exciting control for gradually increasing power output to restrict driving torque from increasing rapidly at a time applying electric load during idling. As another example, the function is a regeneration control for regenerating energy. A regulation voltage is increased during vehicle deceleration to forcibly generate power, and kinetic energy is converted to electrical energy.

The functions required to the IC generator are different depending on types of vehicles on which the ac generator is mounted. Therefore, the type of the IC regulator is increased. Also, the number of external terminals of the ac generator for receiving and transmitting electric information from and to external circuits is different depending on the type of IC regulator. Further, direction of the terminals and the shapes of connectors that protect the terminals, and mounting positions of the IC regulators are different depending on the type of vehicle on which the ac generator is mounted. The vehicle ac generator having the IC generator is for example disclosed in JP-A-2001-28857 and JP-A-2001-298967 (US2001/0030472A1).

Generally, the IC regulator is electrically connected and fixed to a regulator case in which the external terminals, connectors and internal terminals are integrally molded. The external terminals receive electric information from external circuits. The internal terminals provide electrical connection between the IC regulator and internal circuits. For example, the internal terminals include a terminal of a brush connecting to a field winding of a rotor and a terminal grounded to a frame.

The IC generator is mounted on the regulator case in ways shown in FIGS. 8 and 9, for example. In FIG. 8, the regulator case has the connector and external terminals extending in a direction perpendicular to an axial direction of a rotor, that is, in a radial direction. In FIG. 9, the regulator case has the connector and external terminals extending in the axial direction of the rotor. In both of the cases, the IC regulator is positioned with respect to the regulator case by engaging a hole of the IC regulator with a projection of the regulator case, and intermediate terminals of the IC regulator are connected to intermediate terminals of the regulator case.

The mounting position and or functions of the vehicle ac generator are different depending on the type of the vehicles, and the directions and number of the external terminals and the shape of the connector are different depending on the vehicle ac generator. Therefore, it is required to manufacture multiple types of IC regulators having different shapes. Accordingly, it is difficult to reduce manufacturing costs.

Further, since the regulator cases have complicated shapes as shown in FIGS. 8 and 9, multiple molding dies, which are removed in different directions, are required to mold the regulator cases. Therefore, the costs of the molding dies are increased. In addition, for fixing or welding the IC regulator with the regulator case, various types of fixing jigs are required. Therefore, the costs of the jigs are increased. Furthermore, this results in an increase in the manufacturing steps because the jigs are set in several times.

SUMMARY OF THE INVENTION

The present invention is made in view of the foregoing matter and it is an object of the present invention to provide a vehicle ac generator capable of reducing manufacturing costs.

According to a first aspect of the present invention, a vehicle ac generator includes a rotor, a stator opposed to the rotor, a rectifying device connected to an output wire of the stator, a regulator for controlling output voltage, an individual connector, and a common connecter connected to the individual connector. The individual connector includes external terminals that receives and transmits electric information from and to an external circuit and intermediate terminals. The common connector includes intermediate terminals that make contact with the intermediate terminals of the individual connector and internal terminals that connect the regulator to an internal circuit of at least one of the rectifying device and the rotor. The individual connector and the common connector have engaging portions that engages with each other. The engaging portions are provided by projections and recesses.

Accordingly, a connector is constructed of the common connector and the individual connector. By changing the individual connector, the connector can be used for many types of ac generator. Because the common connector is shared, portions to be changed according to the types of vehicles are reduced. Because the regulator and the connector can be shared in multiple types of ac generator, manufacturing costs can be reduced. Further, since the connector is constructed of a combination of separate connectors, the shape of each connector is simple. Accordingly, the shape of the molding dies for molding the connectors is simple, thereby reducing manufacturing costs of the molding dies.

Preferably, the common connector is connectable with each of a plurality of individual connectors having different shapes. By replacing the individual connector, the connector can be used in plural types of ac generator in which the directions and the numbers of the external terminals and connector shape around the external terminals are different.

For example, the common connector is connectable with an individual connector that has the external terminals in an axial direction of the rotor and another individual connector that has the external terminals in a radial direction of the rotor. By this, the connector case that has the external terminals in the axial direction and the connector case that has the external terminals in the radial direction can be formed by using the same common connector. Accordingly, the types of the molding die are reduced, resulting in the reduction of the manufacturing costs.

Preferably, the engaging portions of the common connector include first engaging portions extending in the radial direction and the second engaging portion extending in the axial direction. The engaging portion of the individual connector extend in one of the axial direction and the radial direction. Accordingly, the individual connector can be connected to the common connector in different two directions.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to drawings.

Figure 1:
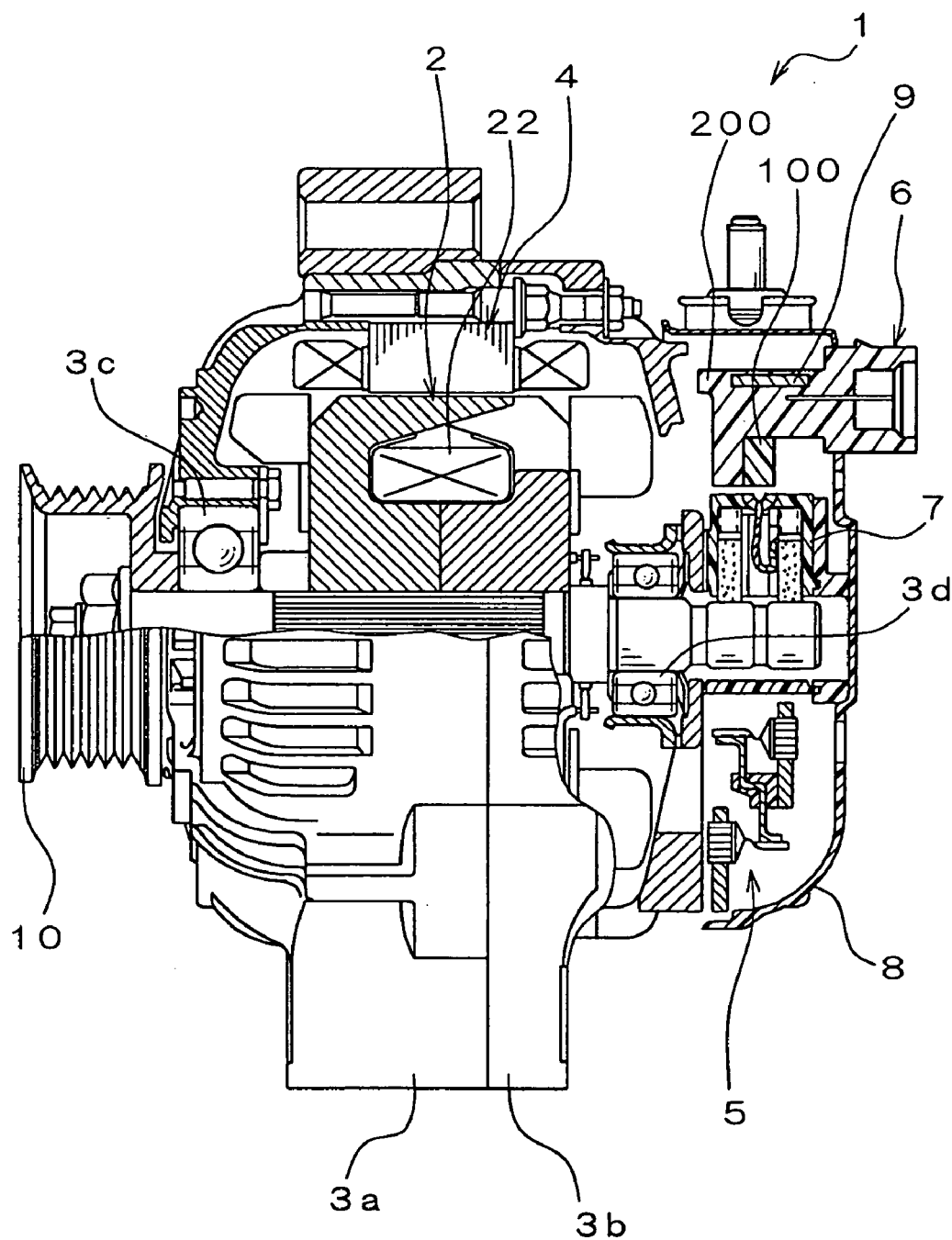
FIG. 1 is a schematic cross-sectional view of a vehicle ac generator according to an embodiment of the present invention.

Referring to FIG. 1, a vehicle ac generator 1 in which the present invention is employed includes a rotor 2, a stator 4, a front frame 3a, a rear frame 3b, a rectifying device 5, a connector case 6, a brush device 7, a protection cover 8, an IC regulator 9 and the like.

The rotor 2 is rotated by receiving a driving force from an engine through a belt (not shown) and a pulley 10. The stator 4 is opposed to the rotor 2. The stator 4 functions as an armature. The rotor 2 and the stator 4 are supported in the front frame 3a and the rear frame 3b through a pair of bearings 3c, 3d. The rectifying device 5 connects to an output lead of the stator 4 and rectifies ac output to direct current. The brush device 7 holds brushes that supply a field current to a field coil 22 of the rotor 2. The IC regulator 9 controls output voltage. The connector case 6 has terminals for inputting and outputting electric information between the vehicle and the ac generator 1. The protection cover 8 is made of resin and attached to an axial end surface of the rear frame 3b to cover the rectifying device 5, the IC regulator 9, the brush device 7 and the like.

Figure 2:
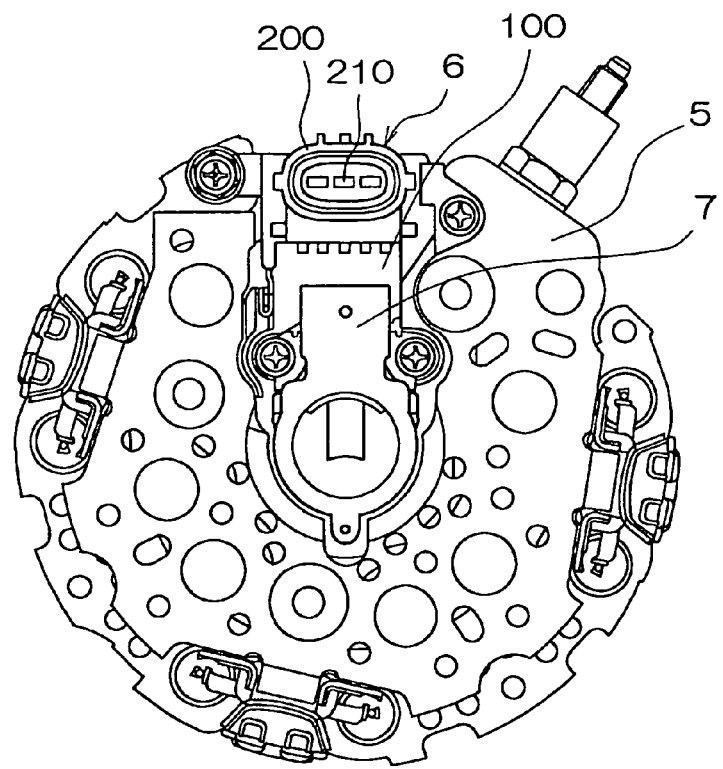
FIG. 2 is a plan view of a rectifying device on which a connector case and a brush device are mounted according to the embodiment of the present invention.

Next, the connector case 6 will be described in detail. As shown in FIG. 2, the connector case 6 is mounted to the rectifying device 5 with the brush device 7. The connector case 6 is configured such that the external terminals 210, which receive and transmit electric information between external circuits such as an engine control unit (not shown) and the ac generator 1, extend in an axial direction of the rotor 2. The connector case 6 is constructed of a combination of a common connector 100 and an individual connector 200.

Figure 3:
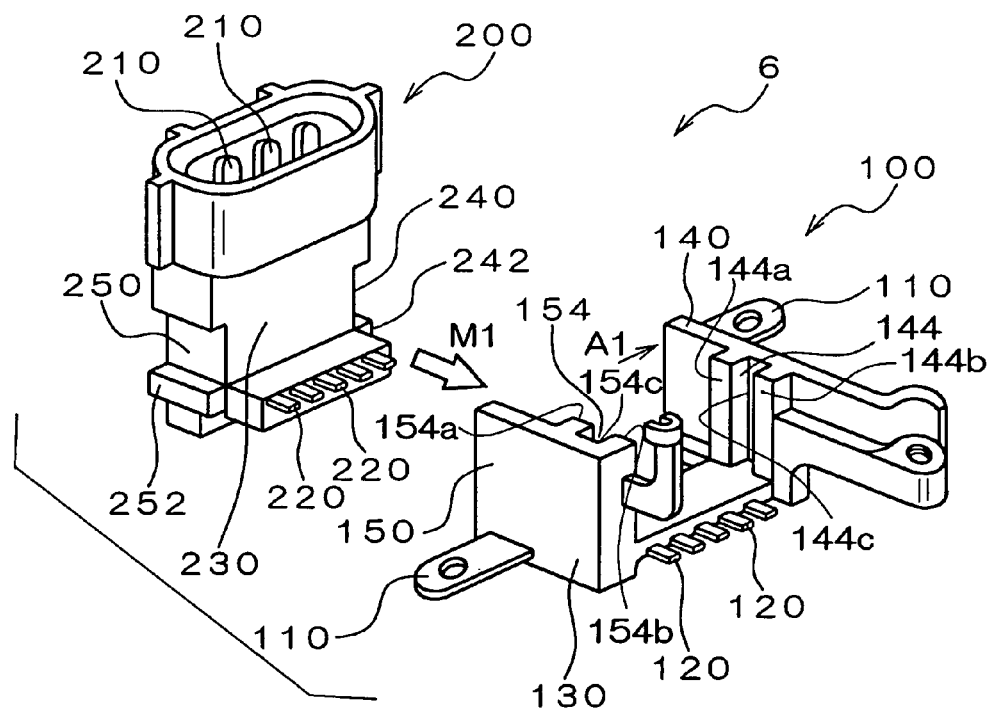
FIG. 3 is an exploded perspective view of the connector case according to the embodiment of the present invention.
Figure 4:
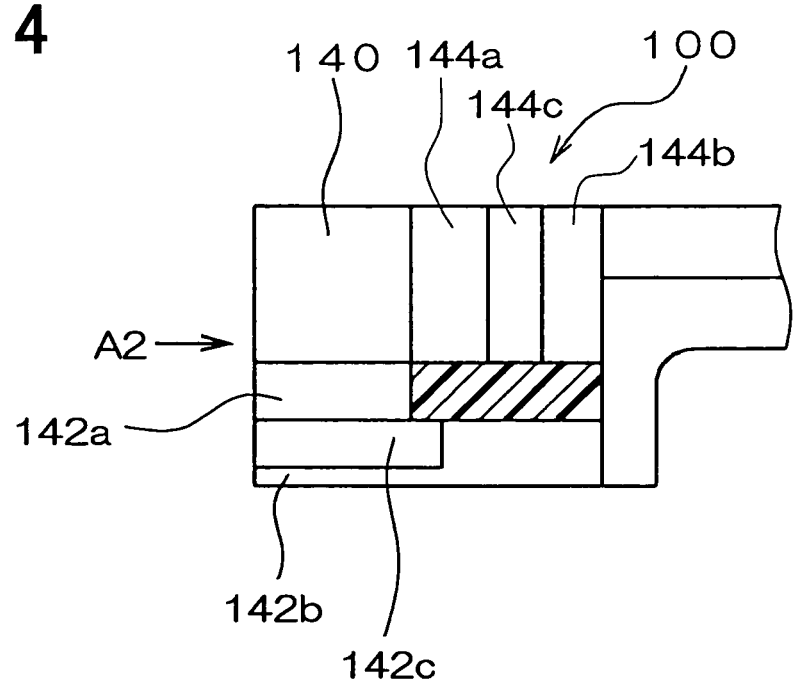
FIG. 4 is a side view of a common connector of the connector case shown in FIG. 3 viewed along an arrow A1.
Figure 5:
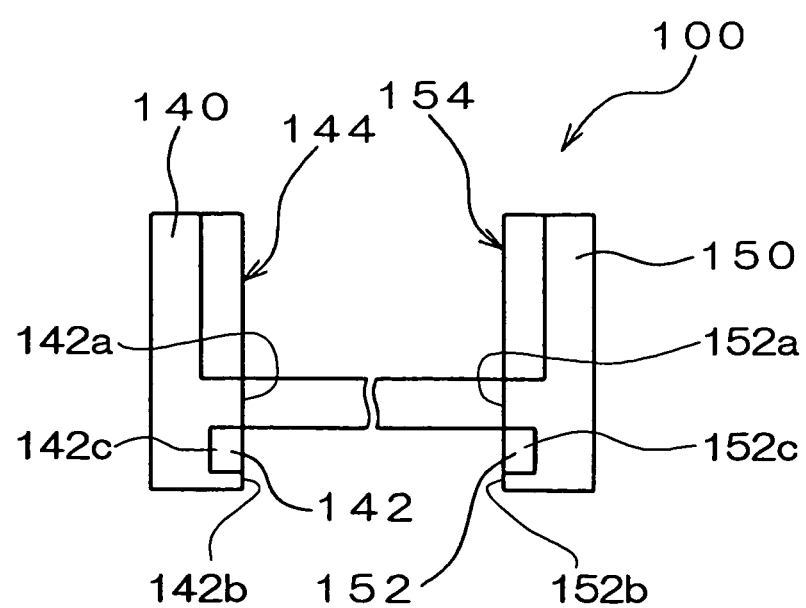
FIG. 5 is an end view of the common connector viewed along an arrow A2 of FIG. 4.

FIG. 4 shows the common connector 100 viewed along an arrow A1 of FIG. 3. FIG. 5 shows the common connector 100 viewed along an arrow A2 of FIG. 4. The common connector 100 includes internal terminals 110, intermediate terminals 120 and a common connector case 130. The internal terminals 110 are provided to connect the IC regulator 9 to internal circuits of the vehicle ac generator 1, such as circuits of the rectifying device 5, the brush device 7 and the field coil 22. The intermediate terminals 120 are provided to make contact with the individual connector 200. The internal terminals 110 and the intermediate terminals 120 are integrally molded into the common connector case 130.

As shown in FIGS. 3 through 5, the common connector case 130 has a pair of side walls 140, 150, a pair of first engaging portions (projections and recesses) 142, 152, and a pair of second engaging portions (projections and recesses) 144, 154. The side walls 140, 150 are parallel in the axial direction of the rotor 2 and spaced from each other. The first engaging portions 142, 152 are formed on inside surfaces of the side walls 140, 150 that face each other. The first engaging portions 142, 152 are disposed to extend in a radial direction of the rotor 2 that is perpendicular to the axial direction. The second engaging portions 144, 154 are formed on the inside surfaces of the side walls 140, 150. The second engaging portions 144, 154 are disposed to extend in the axial direction.

Specifically, one of the first engaging portions 142 is formed on the inside surface of one side wall 140. The first engaging portion 142 includes a pair of projections 142a, 142b and a recess 142c between the projections 142a, 142b. Similarly, the opposite first engaging portion 152 is formed on the inside surface of the opposite side wall 150. The first engaging portion 152 on the side wall 150 includes a pair of projections 152a, 152b and a recess 152c between the projections 152a, 152b. One of the second engaging portions 144 is formed on the inside surface of one side wall 140. The second engaging portion 144 includes a pair of projections 144a, 144b and a recess 144c between the projections 144a, 144b. Similarly, the opposite engaging portion 154 is formed on the inside surface of the opposite side wall 150. The second engaging portion includes a pair of projections 154a, 154b and a recess 154c between the projections 154a, 154b.

On the other hand, the individual connector 200 has the external terminals 210, intermediate terminals 220 and an individual connector case 230. The external terminals 210 are provided to receive and transmit the electric information from and to the external circuits. The intermediate terminals 220 are provided to make contact with the common connector 100. The external terminals 210 and the intermediate terminals 220 are integrally molded into the individual connector case 230. The individual connector case 230 forms a pair of side surfaces 240, 250 and a pair of engaging portions 242, 252. The side surfaces 240, 250 are parallel to each other in the axial direction. The engaging portions 242, 252 are formed on the side surfaces 240, 250 at predetermined positions and extend in the radial direction of the rotor 2.

The engaging portion 242 is formed into a shape to engage with the first engaging portion 142 of the common connector 100 at a predetermined position. In the embodiment, the engaging portions 242, 252 are formed into projections to be inserted in the recesses 142c, 152c of the common connector 100. The individual connector 200 is positioned and fixed to the common connector 100 by inserting the projection 242 into the recess 142c between the projections 142a, 142b, as denoted by an arrow M1 in FIG. 3. Similarly, the opposite engaging portion 252 is formed into a shape to engage with the first engaging portion 152 of the common connector 100 at a predetermined position. The individual connector 200 is positioned and fixed to the common connector 100 by inserting the projection 252 into the recess 152c between the projections 152a, 152b.

In the condition that the individual connector 200 is fixed to the common connector 100 in the above manner, the intermediate terminals 120 of the common connector 100 contact the intermediate terminals 220 of the individual connector 200. The intermediate terminals 120 of the common connector 100 and the intermediate terminals 220 of the individual connector 200 are opposed to each other, so that multiple pairs of terminals are provided. The pairs of terminals forms a terminal group. Further, the paired intermediate terminals are electrically connected such as by soldering and welding. Thereafter, the paired intermediate terminals are coated with an insulating resin or covered with a cap made of an insulating material so that each pair of intermediate terminals can be insulated from adjacent pair of terminals.

In the embodiment, the connector case 6 is constructed of the common connector 100 and the individual connector 200. Therefore, when the type of specification of the ac generator is changed for example depending on the types of vehicle, the individual connector 200 is replaced with another individual connector 200 and the same common connector 100 is used. Therefore, on designing a different-type regulator case 6, portions to be changed are decreased. Since the design changes of the IC regulator 9 and the connector case 6 are reduced, the manufacturing costs can be reduced. Since the connector 6 is constructed by connecting separate connectors 100, 200, the shape of each connector 100, 200 is simplified. With this, the shape of molding die for each connector 100, 200 is simplified. Therefore, costs for manufacturing the dies are reduced.

Figure 6:
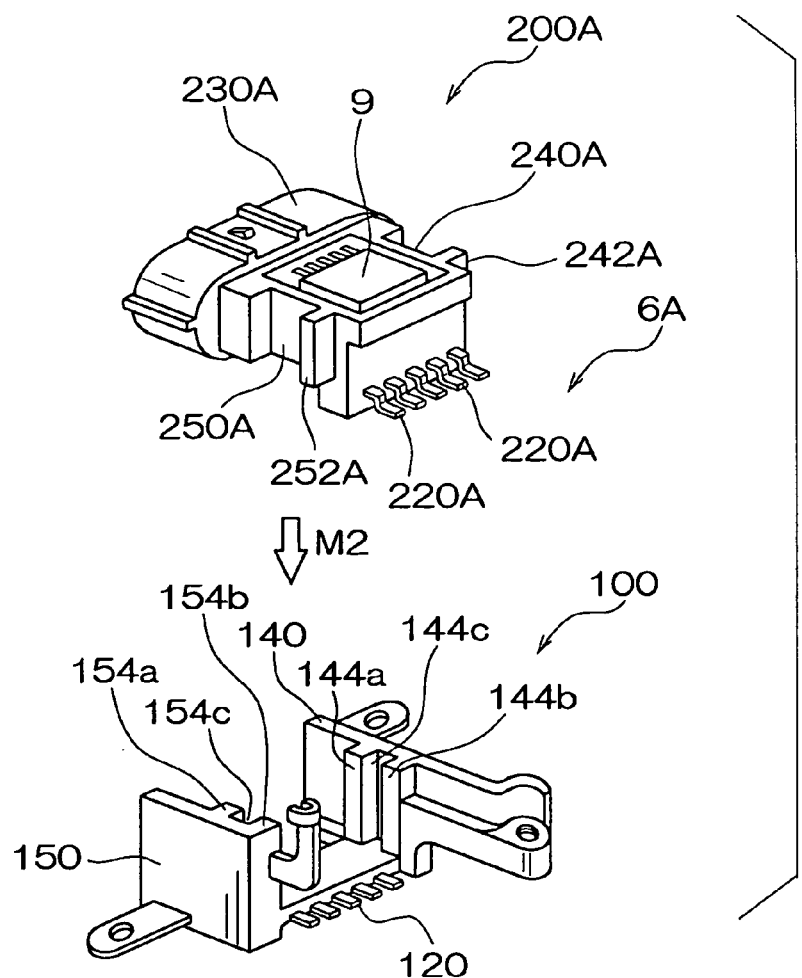
FIG. 6 is an exploded perspective view of a connector case according to another embodiment of the present invention.

FIG. 6 shows an exploded perspective view of a connector case 6A, as another embodiment. The connector case 6A is constructed of a combination of the common connector 100 and an individual connector 200A that has a shape different from the individual connector 200 of the above embodiment. In the connector case 6A, the external terminals that receives and transmits electric information from and to the external circuits are provided to extend in the radial direction of the rotor 2. The connector case 6A is constructed by combining the individual connector 200A with the common connector 100. The common connector 100 is the same as that shown in FIG. 3.

The individual connector 200A includes the external terminals (not shown) and intermediate terminals 220A that make contact with the intermediate terminals 120 of the common connector 100. The intermediate terminals 220A are integrally molded into an individual connector case 230A. The individual connector case 230A forms a pair of side surfaces 240A, 250A and a pair of engaging portions 242A, 252A. The side surfaces 240A, 250A are parallel to each other and extend in the axial direction. The engaging portions 242A, 252A are formed on the side surfaces 240A, 250A at the predetermined positions, in the axial direction. That is, the engaging portions 242A, 252A are perpendicular to the external terminals 220A.

One engaging portion 242A is shaped to engage with the second engaging portion 144 of the common connector 100 at a predetermined position. The engaging portion 242A is for example in a form of projection and is inserted in the recess 144c between the projections 144a, 144b of the common connector 100. By inserting the projection 242A into the recess 144c, as denoted by an arrow M2, the individual connector 200A is positioned with respect to and fixed to the common connector 100. Similarly, the opposite engaging portion 252A is shaped to engage with the second engaging portion 154 of the common connector 100 at a predetermined position. The engaging portion 252A is for example in a form of projection and is inserted in the recess 154c between the projections 154a, 154b of the common connector 100. By inserting the projection 252A into the recess 154c, the individual connector 200A is positioned with respect to and fixed to the common connector 100.

In the condition that the individual connector 200A is fixed to the common connector 100, the intermediate terminals 220A of the individual connector 200A and the intermediate terminals 120 of the common connector 100 make contact with each other. Each of the intermediate terminals 220A is opposed to and paired with each of the intermediate terminals 120 of the common connector 100. The paired terminals construct the terminal group. The paired terminals are electrically connected by such as soldering and welding. The intermediate terminals 220A of the individual connector 200A are bent into the shape shown in FIG. 6. Therefore, when the individual connector 200A is fixed to the common connector 100, the terminals 200A securely contact with the second terminals 120.

Accordingly, the common connector 100 can be connectable with the individual connector 200 that has the external terminals 210 extending in the axial direction of the rotor 2 and the individual connector 200A that has the external terminals 210 extending in the radial direction of the rotor 2. Therefore, the connector case 6 that has the external terminals 210 in the axial direction of the rotor 2 and the connector case 6A that has the external terminals extending in the radial direction of the rotor 2 can be manufactured by using the same common connector 100. Since the molding die configuration is simplified, manufacturing costs can be reduced.

Further, the common connector 100 has both of the first engaging portion 142, 152 extending in the radial direction and the second engaging portion 144, 154 extending in the axial direction. The individual connector 200, 200A has the engaging portion 242, 252, 242a, 252a in one of the axial direction of the rotor 2 and the radial direction of the rotor 2. Therefore, the individual connectors 200, 200A can be fixed to the common connector 100 from the different directions. Accordingly, even in the case that the direction of the external terminals is different, the same common connector 100 can be used.

The present invention is not limited to the above embodiments, but may be implemented in other ways without departing from the spirit of the invention.

In the above embodiments, two individual connectors 200, 200A are used for providing two types of the common connector cases 6, 6A. However, the two types of connector cases can be formed by using the same individual connector and the common connector. In the connector cases, the individual connector is fixed to the common connector in different directions.

Figure 7:
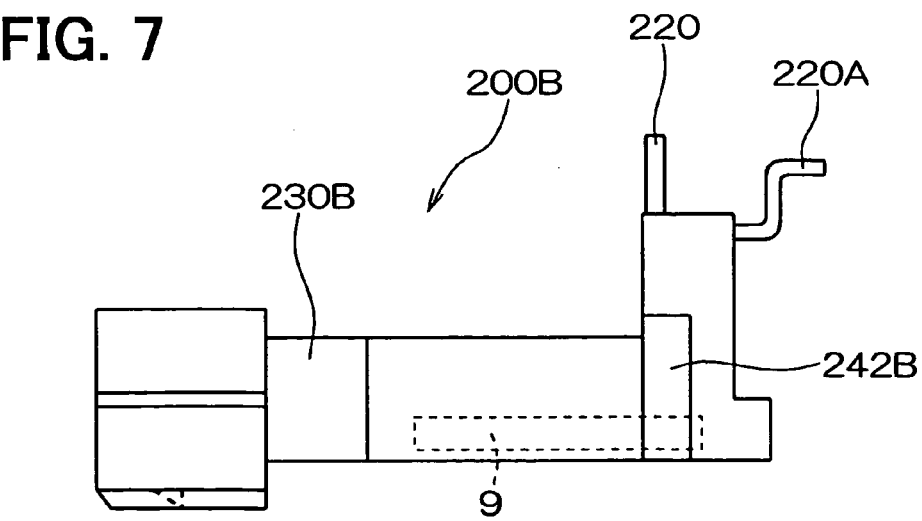
FIG. 7 is a side view of an individual connector of a connector case according to further another embodiment of the present invention.
Figure 8:
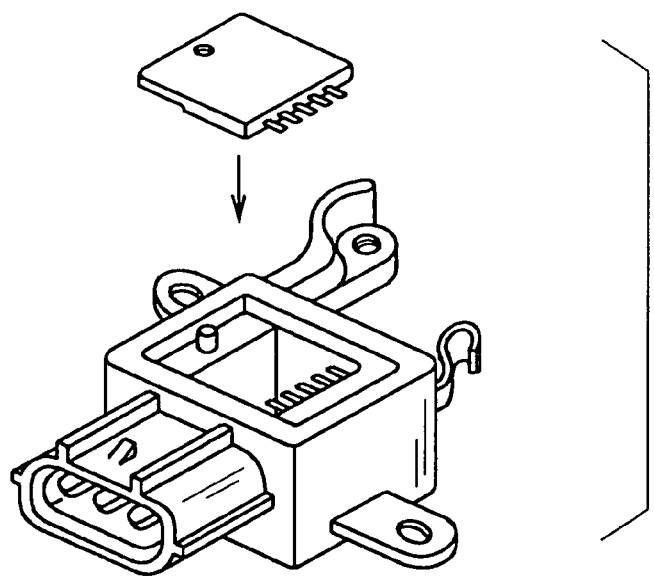
FIG. 8 is a perspective view of a regulator case to which an IC regulator is mounted according to a related art.
Figure 9:
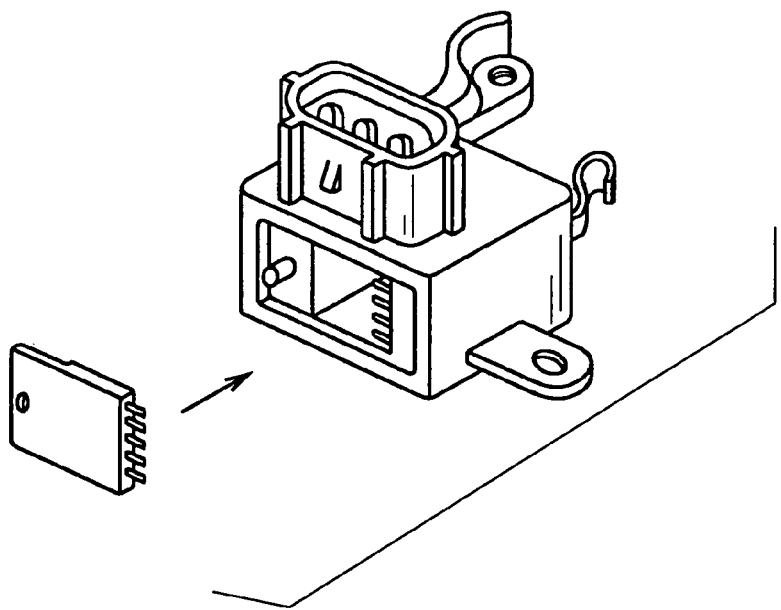
FIG. 9 is a perspective view of a regulator case to which an IC regulator is mounted according to another related art.

For example, the individual connector 200, 200A can be modified as shown in FIG. 7. The individual connector 200B has an individual connector case 230B. IN the individual connector case 230B, the intermediate terminals (first group of intermediate terminals) 220 of the individual connector 200 shown in FIG. 3 and the terminals 220A of the individual connector (second group of intermediate terminals) 200A shown in FIG. 6 are integrally molded. The external appearance of the individual connector case 230B is similar to the individual connectors 220, 220A shown in FIGS. 3 and 6. The individual connector 230B has a pair of engaging portions 242B that are the same as the engaging portions 242, 242A, 252, 252A. The individual connector 200B is different from the individual connectors 200, 200A because it has both of the intermediate terminals 220, 220A.

In the individual connector 200B, one of the intermediate terminals 220, 220A, which do not contact with the intermediate terminals of the common connector 100, are removed as required. When the intermediate terminals 220A are removed from the individual connector 200B, the individual connector 200B can be used in a manner similar to that shown in FIG. 3. In this case, the engaging portions 242B engage with the first engaging portions 142, 152 of the common connector 100. On the other hand, when the external terminals 220 are removed from the individual connector 200B, the individual connector 200B can be used in a manner similar to that shown in FIG. 6. In this case, the engaging portion 242B engage with the second engaging portions 144, 154 of the common connector 100. Accordingly, since the individual connector 200B can be used in two ways, the individual connector 200B can be formed by a single type of molding die. Further, the regulator 9 and the individual connector 200B can be connected by using the same jig. Accordingly, manufacturing costs such as for the molding die and connecting jigs can be reduced. Also, the manufacturing steps can be decreased.

Also, in the above embodiments, the number of the intermediate terminals 120 of the common connector 100 is the same as the number of the intermediate terminals 220, 220A of the individual connectors 200, 200A, 200B. Alternatively, the number of the intermediate terminals 120 of the common connector 100 can be greater than that of the individual connectors 200, 200A, 200B. By this arrangement, the common connector 100 can be connected with another individual connector 200 that has the different number of the terminals according to the differences of the functions of the regulator 9.

In the example shown in FIG. 7, two types of terminals 220, 220A are provided in the individual connector 200B and one type of the terminals, which do not contact with intermediate terminals 120 of the common connector 100, are removed. Alternatively, two-types of intermediate terminals can be provided in the common connector 100 and one type of intermediate terminals, which do not make contact with the intermediate terminal of the individual connector, can be removed. For example, intermediate terminals can be additionally formed in the common connector 100 at the position contacting with the intermediate terminals 220 of the individual connector 200 when the individual connector 200 is fixed in the direction same as the direction of the individual connector 200A shown in FIG. 6. Therefore, the common connector 100 can be connected with the individual connector 200, 200A in two different directions.

In the embodiments, the engaging portions 242, 252, 242A, 252A 242B of the individual connectors 200, 200A, 200B are formed into the shape of the projections and engaged with the recesses 142c, 152c, 144c, 154c of the common connector 100. Alternatively, the projections are formed on the side of the common connector 100 and the recess can be formed on the side of the individual connector 200, 200A, 200B, so that the projections of the common connector 100 can be inserted in the recesses of the individual connector 200, 200A, 200B.

What is claimed is:

1. An ac generator for a vehicle comprising:
a rotor;
a stator opposed to the rotor and having an output lead;
a rectifying device connecting to the output lead of the stator;
a regulator that controls output voltage;
a common connector including internal terminals that connect the regulator with an internal circuit of at least one of the rectifying device and the rotor; and
an individual connector connected to the common connector, the individual connector including external terminals that receive and transmit electric signals from and to an external circuit,
wherein the common connector and the individual connector further include intermediate terminals contacting with each other and engaging portions engaging with each other, the engaging portions being formed of projections and recesses, the engaging portions of the common connector including a first engaging portion that is disposed to extend in an axial direction of the rotor and a second engaging portion that is disposed to extend in a radial direction of the rotor, and the engaging portion of the individual connector is disposed to extend in one of the axial direction and the radial direction.

2. The ac generator according to claim 1, wherein the number of the intermediate terminals of the common connector is equal to or greater than that of the individual connector.

3. The ac generator according to claim 1, wherein the regulator is mounted on the individual connector.

4. The ac generator according to claim 1, wherein the external terminals of the individual connector connect the external circuit with the regulator.

5. An ac generator for a vehicle comprising:
a rotor;
a stator opposed to the rotor and having an output lead;
a rectifying device connecting to the output lead of the stator;
a regulator that controls output voltage;
a common connector including internal terminals that connect the regulator with an internal circuit of at least one of the rectifying device and the rotor; and
an individual connector connected to the common connector, the individual connector including external terminals that receive and transmit electric signals from and to an external circuit,
wherein the common connector and the individual connector further include intermediate terminals contacting with each other and engaging portions engaging with each other, the en a in portions being formed of projections and recesses,
wherein the engaging portions of the common connector include a first engaging portion in a direction parallel to the intermediate terminals of the common connector and a second engaging portion in a direction perpendicular to the first engaging portion, and the engaging portion of the individual connector is disposed in a direction perpendicular to the external terminals, wherein the engaging portion of the individual connector engages with one of the first engaging portion and the second engaging portion of the common connector.

6. The ac generator according to claim 5, wherein the intermediate terminals of the individual connector are disposed to extend in one of a direction parallel to the external terminals and a direction perpendicular to the external terminals.

7. The ac generator according to claim 5, wherein the regulator is mounted on the individual connector in parallel to the external terminals.

8. An ac generator for a vehicle comprising:
a rotor;
a stator opposed to the rotor and having an output lead;
a rectifying device connecting to the output lead of the stator;
a regulator that controls output voltage;
a common connector including internal terminals that connect the regulator with an internal circuit of at least one of the rectifying device and the rotor; and
an individual connector connected to the common connector, the individual connector including external terminals that receive and transmit electric signals from and to an external circuit,
wherein the common connector and the individual connector further include intermediate terminals contacting with each other and engaging portions engaging with each other, the engaging portions being formed of projections and recesses,
wherein the common connector is connectable with each of a plurality of individual connectors having different shapes and the plurality of individual connectors includes a first individual connector having the external terminals in an axial direction of the rotor and a second individual connector having the external terminals in a radial direction of the rotor.

9. An ac generator for a vehicle comprising:
a rotor;
a stator opposed to the rotor and having an output lead;
a rectifying device connecting to the output lead of the stator;
a regulator that controls output voltage;
a common connector including internal terminals that connect the regulator with an internal circuit of at least one of the rectifying device and the rotor; and
an individual connector connected to the common connector, the individual connector including external terminals that receive and transmit electric signals from and to an external circuit,
wherein the common connector and the individual connector further include intermediate terminals contacting with each other and engaging portions engaging with each other, the engaging portions being formed of projections and recesses,
wherein the engaging portion of the common connector forms the projections and the recess between the projections, and the engaging portion of the individual connector forms the projection, wherein the projection of the individual connector is located in the recess of the common connector.

10. An ac generator for a vehicle comprising:
a rotor;
a stator opposed to the rotor and having an output lead;
a rectifying device connecting to the output lead of the stator;
a regulator that controls output voltage;
a common connector including internal terminals that connect the regulator with an internal circuit of at least one of the rectifying device and the rotor; and
an individual connector connected to the common connector, the individual connector including external terminals that receive and transmit electric signals from and to an external circuit,
wherein the common connector and the individual connector further include intermediate terminals contacting with each other and engaging portions engaging with each other, the engaging portions being formed of projections and recesses,
wherein each of the intermediate terminals of the common connector and each of the intermediate terminals of the individual connector are opposed to and paired with each other, and the intermediate terminals of one of the common connector and the individual connector are straight and the intermediate terminals of the opposite one of the common connector and the individual connector are bent.

11. An ac generator for a vehicle comprising:
a rotor;
a stator opposed to the rotor and having an output lead;
a rectifying device connecting to the output lead of the stator;
a regulator that controls output voltage;
a common connector including internal terminals that connect the regulator with an internal circuit of at least one of the rectifying device and the rotor; and
an individual connector connected to the common connector, the individual connector including external terminals that receive and transmit electric signals from and to an external circuit,
wherein the common connector and the individual connector further include intermediate terminals contacting with each other and engaging portions engaging with each other, the engaging portions being formed of projections and recesses,
wherein the intermediate terminals of the individual connector include a first group of intermediate terminals and a second group of intermediate terminals, the first group of intermediate terminals is disposed to make contact with the intermediate terminals of the common connector when the individual connector is connected to the common connecter such that the external terminals extend in an axial direction of the rotor, and the second group of intermediate terminals is disposed to make contact with the intermediate terminals of the common connector when the individual connector is connected to the common connector such that the external terminals extend in a radial direction of the rotor, wherein the second group of intermediate terminals is removed when the individual connector is connected such that the external terminals extend in the axial direction, and the first intermediate terminals are removed when the individual connector is connected such that external terminals extend in the radial direction.

12. An ac generator for a vehicle comprising:
a rotor;
a stator opposed to the rotor and having an output lead;

a rectifying device connecting to the output lead of the stator;

a regulator that controls output voltage;

a common connector including internal terminals that connect the regulator with an internal circuit of at least one of the rectifying device and the rotor; and an individual connector connected to the common connector, the individual connector including external terminals that receive and transmit electric signals from and to an external circuit, wherein the common connector and the individual connector further include intermediate terminals contacting with each other and engaging portions engaging with each other, the engaging portions being formed of projections and recesses, wherein the common connector includes plural groups of intermediate terminals, the individual connector is connectable with the common connector in different directions so that the intermediate terminals of the individual connector make contact with at least one group of intermediate terminals of the common connector, and the remaining group of intermediate terminals of the common connector are removed.

* * * * *